(12) United States Patent
Park et al.

(10) Patent No.: US 7,719,730 B2
(45) Date of Patent: May 18, 2010

(54) IMAGE READER FOR USE IN AN IMAGE FORMING APPARATUS, AND CONTAMINATION CHECK METHOD OF GUIDE FILM FOR THE SAME

(75) Inventors: Sang-cheol Park, Suwon-si (KR); Young-min Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1185 days.

(21) Appl. No.: 11/289,498

(22) Filed: Nov. 30, 2005

(65) Prior Publication Data
US 2006/0158701 A1 Jul. 20, 2006

(30) Foreign Application Priority Data
Jan. 19, 2005 (KR) .................. 10-2005-0004792

(51) Int. Cl.
*H04N 1/04* (2006.01)
(52) U.S. Cl. .................. 358/498; 358/486; 358/497; 358/496; 358/474; 399/107; 399/374; 399/393; 399/361; 271/9.09; 271/10.09; 271/126; 271/147
(58) Field of Classification Search .................. 358/474, 358/498, 486, 497, 496; 271/3.14, 9.09, 271/10.09, 126, 147, 122; 399/107, 124, 399/111, 281, 374, 393, 361, 167
See application file for complete search history.

(56) References Cited
U.S. PATENT DOCUMENTS
4,264,187 A * 4/1981 Rhodes, Jr. .................. 399/374
5,328,163 A * 7/1994 Yamada .................. 271/10.01
5,828,932 A * 10/1998 Ohata et al. .................. 399/209
5,887,866 A * 3/1999 Yamauchi et al. ........... 271/116
6,134,417 A * 10/2000 Fukasawa .................. 399/367
6,512,602 B1 * 1/2003 Sheng et al. .................. 358/498

(Continued)

FOREIGN PATENT DOCUMENTS
JP 10-236687 9/1998

(Continued)

*Primary Examiner*—Negussie Worku
(74) *Attorney, Agent, or Firm*—Staas & Halsey LLP

(57) ABSTRACT

An image reading apparatus for use in an image forming apparatus includes a document glass installed on an upper side of the image reading body on which a document is placed; an image reading sensor installed under the document glass for stopping after being transferred to a predetermined position or for reciprocating in a straight direction parallel to the document glass; a cover for opening and closing the upper surface of the document glass; an automatic document feeder (ADF) for feeding the document to the position to which the image reading sensor is fixed; a document discharging plate for discharging the document fed through the automatic document feeding unit; first and second guide members for guiding to allow the document fed through the automatic document feeding unit to be discharged to the document discharging plate, the first and second guide members being installed at a predetermined interval to expose the document toward the image reading sensor; and a guide film installed to cover the interval between the first and second guide members for guiding to allow the document to be discharged to the document discharging plate. By this structure, a size of the image forming apparatus can be reduced.

30 Claims, 6 Drawing Sheets

U.S. PATENT DOCUMENTS

| | | | |
|---|---|---|---|
| 6,937,367 B2 * | 8/2005 | Yamaguchi | 358/474 |
| 7,385,735 B2 * | 6/2008 | Makino et al. | 358/496 |
| 7,401,772 B2 * | 7/2008 | Oomori et al. | 271/3.14 |
| 2002/0057465 A1 * | 5/2002 | Anzai | 358/474 |
| 2004/0223192 A1 * | 11/2004 | Hiromatsu et al. | 358/474 |
| 2004/0246540 A1 * | 12/2004 | Makino | 358/498 |
| 2005/0030599 A1 * | 2/2005 | Fukumura | 358/498 |
| 2005/0035527 A1 * | 2/2005 | Oomori et al. | 271/10.09 |
| 2005/0157351 A1 * | 7/2005 | Matsuda | 358/474 |
| 2008/0111293 A1 * | 5/2008 | Shingai | 271/3.14 |
| 2009/0243189 A1 * | 10/2009 | Matsushima | 271/10.09 |

FOREIGN PATENT DOCUMENTS

| | | |
|---|---|---|
| JP | 2001-24856 | 1/2001 |
| JP | 2002-10033 | 1/2002 |

* cited by examiner

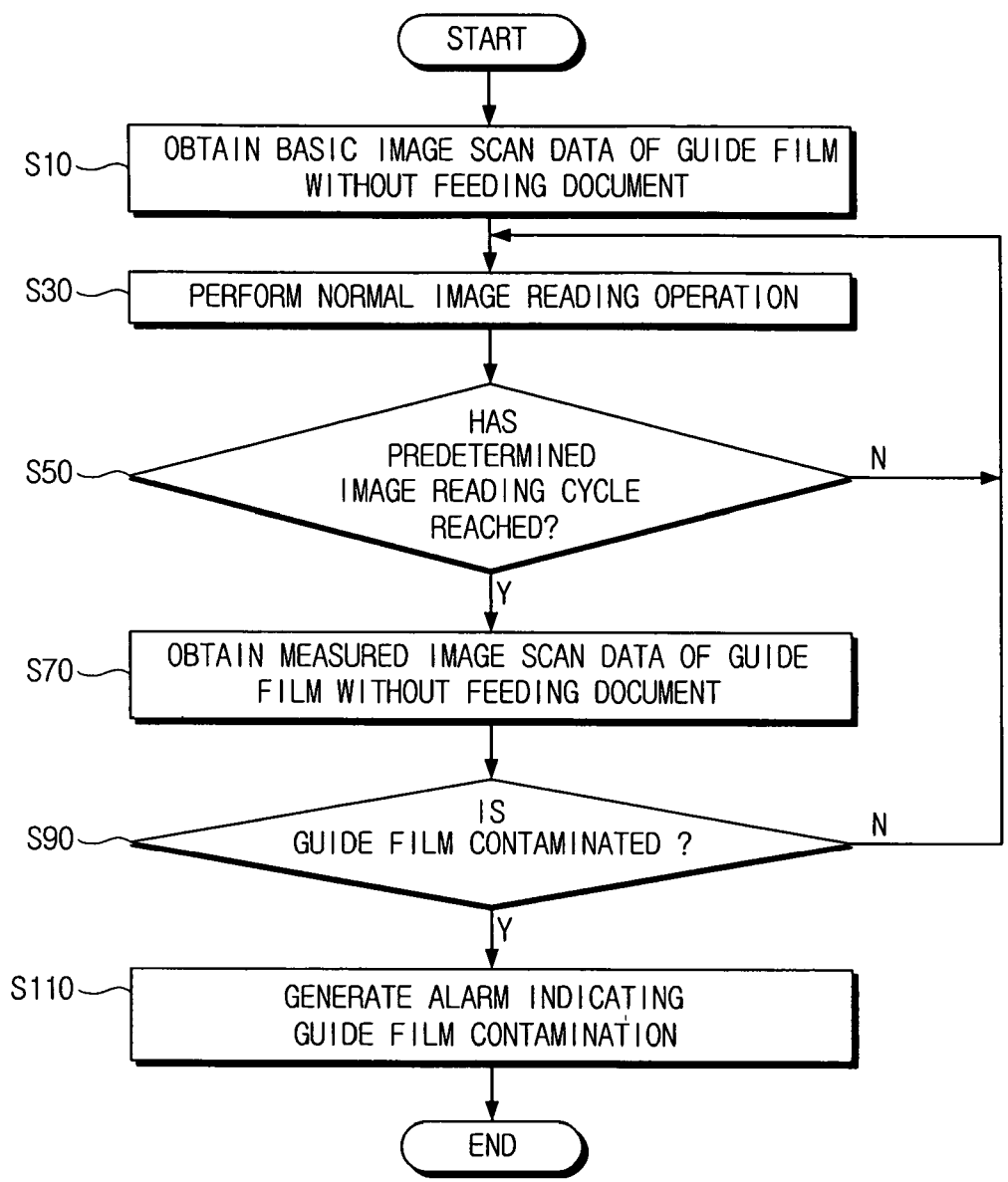

IMAGE READER FOR USE IN AN IMAGE FORMING APPARATUS, AND CONTAMINATION CHECK METHOD OF GUIDE FILM FOR THE SAME

CROSS-REFERENCE TO RELATED APPLICATIONS

This application claims all benefits accruing under 35 U.S.C. § 119 from Korean Patent Application No. 2005-4792 filed on Jan. 19, 2005 in the Korean Intellectual Property Office, the entire content of which is incorporated by reference herein.

BACKGROUND OF THE INVENTION

1. Field of the Invention

The present invention relates to an image forming apparatus and an image reader for use therein, and more particularly, to an image reader for use in an image forming apparatus to minimize the size of a scanning portion, via an Auto Document Feeder (ADF) scanning area and a flatbed scanning area, and a method for checking the contamination of a guide film.

2. Related Art

Generally, an image reader is included as part of an image forming apparatus, such as, a printer, a facsimile machine, a photocopier and a multi-functional product, for reading an image of a document, via a flatbed scanning method, while moving an image reading sensor, and for reading the image of a document, via an ADF (Automatic Document Feeder) scanning method, while transferring the document with the image reading sensor being fixed.

FIG. 1 illustrates an example image forming apparatus. Referring to FIG. 1, the image forming apparatus 1 includes an image reader 10 for reading an image of documents D1 and D2; an image former 30 for forming an image on a printable medium such as paper (P) on the basis of information read from the image reader 10; and a paper feeding mechanism 40 provided on a lower part of the image former 30 to feed individual sheets of paper from a paper feeding cassette 50 into the image former 30 for image formation.

The image reader 10 includes an image reading table 11 having a platen glass 12 to accommodate different standard sized papers, and an automatic document feeder (ADF) 13 to automatically feed individual sheets of print media, such as document D1 and document D2, from different trays, to be read by the image reader 10. In addition, a housing is provided to house the image reader 10, the image former 30, the paper feeding mechanism 50, the paper feeding cassette 70 and related components (not shown) along with a control and display panel 20 for controlling operation and providing visual display of operation. Typically, the image reader 10 utilizes two scanning methods, that is, an ADF scanning method for supplying an image reading sensor 14 at a predetermined location and then reading an image from a document D1 while conveying the document D1, via an ADF 13, and a flatbed scanning method for fixing a document D2 on an image reading table 11 and then reading an image while moving an image reading sensor 14 in bi-directions (⇆).

As shown in FIG. 1, the image reader 10 also includes an ADF glass 15 provided in the ADF 13 for the ADF scanning, and a platen glass 15 provided on the image reading table 11 for the flat bed scanning. In addition, the image reader 10 further includes a guide member 16 located between the ADF glass 15 and the platen glass 12 for guiding to discharge the document D1 fed from the ADF 13 to a document discharging plate 17.

However, there are several problems associated with the arrangement shown in FIG. 1. First, the width H1 of the image reader 10 is increased and unnecessarily large, since the ADF scanning area A and the flatbed scanning area F are separated from each other.

In addition, there has been another problem in that the width H1 of the image reader 10 is not similar to or identical with a width H2 of a lower part of the image former 30. As a result, the product, i.e., image forming apparatus can be unstable since the image reader 10 can be much larger than the image former 30, or vice versa.

Further, there has been another problem in that, as the size of the image forming apparatus is increased, it is inconvenient to distribute and handle the product. That is, since the size of the image reader 10 is increased relative to the image former 30, the size of the package box for the product, i.e., the image forming apparatus, must also increase, and unnecessary space within the box can be formed. Thus, it is difficult to efficiently package the product, and the product is likely to be easily damaged against impact during distribution.

SUMMARY OF THE INVENTION

Various aspects and example embodiments of the present invention advantageously provide an image reader for use in an image forming apparatus to minimize the size of the image forming apparatus by using a document glass for ADF scanning and a document glass for flatbed scanning as an integral member and using a guide film instead of a guide member.

Another aspect of the present invention is to provide a method for checking the contamination level of a guide film of an image reader for use in an image forming apparatus.

In accordance with an aspect of the present invention, there is provided an image reading apparatus comprising a document glass installed on an upper side of an image reading table, a document being placed on an upper surface thereon; an image reading sensor provided under the document glass for performing an image reading operation; a cover for opening and closing the upper surface of the document glass; an automatic document feeder (ADF) for feeding the document along an image reading path to a predetermined location at which the image reading sensor is provided for an image reading operation; a document discharging plate for discharging the document fed through the ADF for the image reading operation; first and second guide members for guiding the document fed through the ADF to be discharged to the document discharging plate, the first and second guide members being installed at a predetermined interval to expose the document toward the image reading sensor for performing the image reading operation; and a guide film installed to cover the interval between the first and second guide members for guiding the document along the image reading path to be discharged to the document discharging plate.

Preferably, the guide film may be made of transparent material. In addition, one end of the guide film is connected to an upper surface of the second guide member, and the other end of the guide film is projected under the first guide member, such that the guide film is elastically moved according to the opening and closing operations of the cover.

Further, it is desirable to allow the guide film to be installed replaceable. To do this, a replaceable structure is constituted to allow a portion of the second guide member attached to the guide film to be detachably formed such that the portion attached to the guide film is replaced.

Preferably, the second guide member may be additionally provided with an antistatic brush for removing static electricity of the document which passes through the guide film. The antistatic brush has a length corresponding to a width of the document.

Furthermore, it is desirable to further include a contamination checking unit for checking whether the guide film is contaminated. The contamination checking unit comprises a first memory for storing basic scan data obtained under an initial condition that the document is not existed, a second memory for storing measured scan data obtained again under the condition that the document is not existed after performing the image reading operation of the document in a predetermined cycle, and a comparison processor for comparing the value stored in the first memory and the value stored in the second memory and determining whether the guide film is contaminated. In addition, an alarm unit is also included for providing a warning of a contamination state of the guide film. The alarm unit may be one of a Liquid Crystal Display (LCD) and a Light Emitting Diode (LED).

In accordance with another aspect of the present invention, there is provided an image reading apparatus comprising an image reading part comprising a document glass installed on an upper side of an image reading body on which a document is placed on an upper surface thereof, an image reading sensor installed under the document glass for stopping after being transferred to a predetermined position or for reciprocation in a straight direction parallel to the document glass, a cover for opening and closing the upper surface of the document glass, an automatic document feeder (ADF) for feeding the document to the position to which the image reading sensor is fixed, a document discharging plate for discharging the document fed through the automatic document feeding unit, first and second guide members for guiding to allow the document fed through the ADF to be discharged to the document discharging plate, the first and second guide members being installed at a predetermined interval to expose the document toward the image reading sensor, and a guide film installed to cover the interval between the first and second guide members for guiding to allow the document to be discharged to the document discharging plate; and an image forming part for forming the image on a printable medium on the basis of information read by the image reading part.

In accordance with yet another aspect of the present invention, there is provided a method for checking contamination of a guide film of an image reading apparatus. Such a method comprises: saving basic scan data by performing an image reading operation under an initial condition that a document is not fed and the guide film is not contaminated; feeding the document through an automatic document feeding unit and then reading the image of the document guided through the guide film by means of an image reading sensor while transferring the document to a document discharging plate; determining whether process for reading the image of the document is reached a predetermined cycle; performing an image reading operation under the condition that the document is not fed if the operation for reading the image of the document is reached the predetermined cycle and obtaining a measured scan data about the contamination of the guide film; and comparing the basic scan data with the measured scan data and determining whether the guide film is contaminated.

Preferably, in the step of determining whether the guide film is contaminated, an alarm generating step for warning the abnormal state if determining that the guide film is contaminated is further included.

Further, preferably, in the alarm generating step, an alarm unit for the alarm generation is one of an LCD and an LED.

Further, preferably, the predetermined cycle is determined when the number of the document processed by the image reading process is reached the base number of sheets.

From the foregoing, according to the image reading apparatus and the image forming apparatus of the invention, there are various advantages in that the size of the image reading apparatus may be reduced by manufacturing integrally the document glass for ADF scanning and the document glass for flatbed scanning, that is, utilizing only a single document glass for both ADF scanning and flatbed scanning, thereby eliminating the use of a guide member, making an assembly easy and reducing the number of parts.

Further, since the size of the image reading apparatus is reduced, in case of constituting a complex machine (that is, image forming apparatus) consisting of an image reading part S and an image forming part P, the width of the image reading part and the width of the image forming part are in balance, thereby to promote the stability of the product and accomplish well-balanced design.

Furthermore, as described above, as it is possible to constitute a complex machine (that is, image forming apparatus) which makes a balance of the image reading part and the image forming part, the problem that the unnecessary space is occurred is resolved, thereby to efficiently package the product.

In accordance with yet another aspect of the present invention, an image reader is provided for use in an image forming apparatus having an image reading table provided with a platen glass. Such an image reader comprises: an image reading sensor provided under the platen glass to perform an image reading operation; a cover rotatably fixed at a distal end of the image reading table to cover the platen glass, the cover including an automatic document feeder (ADF) to feed an individual sheet of a document along an image reading path, via an opening along an image reading direction of the image reading sensor, and a document discharging plate to receive the individual sheet of the document fed through and discharged from the ADF; inlet and outlet guide members installed at respective sides of the opening, and arranged inside the ADF to guide the individual sheet of the document along the image reading path; and a guide film installed to cover the opening between the inlet and outlet guide members, for guiding the individual sheet of the document along the image reading path to be discharged, via the document discharge plate.

The guide film may be made of transparent material, and may be elastic such that, when the cover is closed, the guide film is pressed against the platen glass to seal the opening during the image reading operation, and when the cover is opened, the guide film is unfolded to release any foreign material accumulated thereon during the image reading operation.

The guide film may be installed to be replaceable, and may be attached to an outlet guide member that has a detachable structure.

An antistatic brush may also be provided for removing static electricity generated when the individual sheet of the document passes through the guide film. Such an antistatic brush has a length corresponding to a width of the individual sheet of the document.

A contamination checking unit may also be provided for checking whether the guide film is contaminated. An alarm unit may further be provided for generating a warning indicating an abnormality when the guide film is contaminated by means of the comparison processor. Such a contamination checking unit comprises: a first memory for storing basic scan data obtained under an initial condition that the document is not existed; a second memory for storing measured scan data obtained again under the condition that the document is not existed after performing the image reading operation of the document in a predetermined cycle; and a comparison processor for comparing the value stored in the first memory and the value stored in the second memory and determining whether the guide film is contaminated.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 6 is a flow chart of a process for checking the contamination state of a guide film of an image reader according to an embodiment of the present invention;

DETAILED DESCRIPTION OF THE EMBODIMENTS

Figure 1:
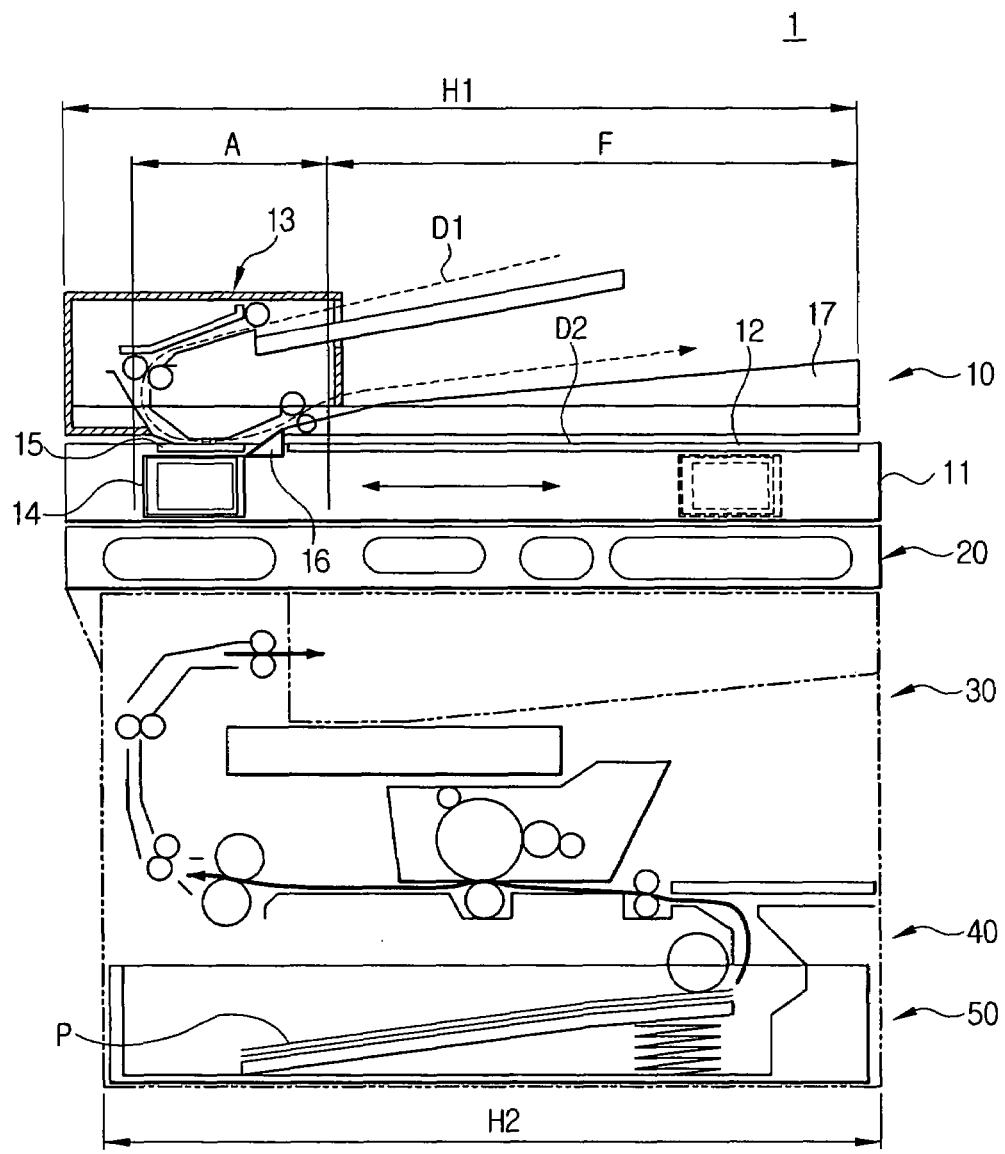
FIG. 1 is a front view of a typical image forming apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
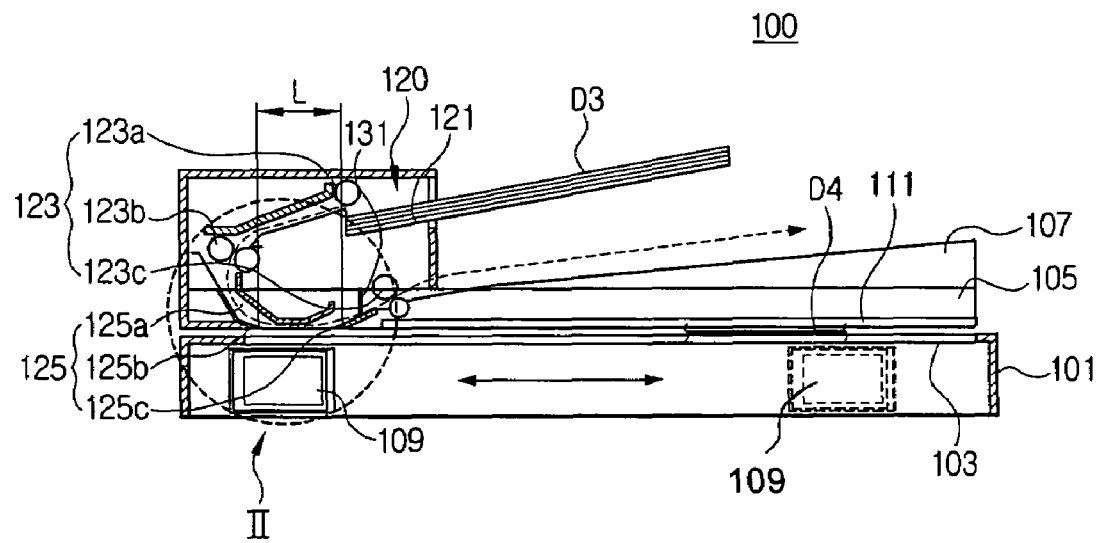
FIG. 2 is a schematic view of an image reader for use in an image forming apparatus according to one embodiment of the invention.

FIG. 2 is a schematic view of an image reader for use in an image forming apparatus according to an embodiment of the present invention.

Referring to FIG. 2, the image reader 100 for use in an image forming apparatus includes an image reading table (body) 101; a document glass 103 formed on a surface of the image reading table 101; a cover 105 secured at a distal end of the image reading table 101 to rotate about the distal end between an open position and a closed position so as to cover the image reading table 101; a document discharging plate 107 arranged as part of the cover 105 to receive individual sheets of paper, such as document D3, from an ADF 120, or document D4 placed on the document glass 103; and an image reading sensor 109 arranged as part of the image reading table 101 underneath the ADF 120 for performing an image reading operation as the individual sheet of paper is being fed through the ADF 120 or being placed on the document glass 103.

Specifically, the document glass 103 is installed on an upper part of the image reading table 101. The image reading sensor 109 is installed to read the image of a document D3 fed through the ADF 120 after transferring to a fixing position within the image reading table 101 or to read the image of a document D4 placed on an upper surface of the document glass 10, while reciprocating in a straight line parallel to the document glass 103. The cover 105 is installed to open and close the upper surface of the document glass 103, and has a pressing member 111 for pressing an upper surface of the document D4 placed on the document glass 103 on a lower part thereof.

The ADF 120 includes a document feeding tray 121 for loading individual sheets of a document D3, and a transfer unit 123 for transferring the individual sheet of the document D3 from the document feeding tray 121 for an image reading operation.

The transfer unit 123 includes a pick-up roller 123a arranged for picking up the individual sheet of the document loaded on the document feeding tray 121, transfer rollers 123b arranged for transferring the picked up document D3 to the document glass 103 for an image reading operation, and discharge rollers 123c arranged for discharging the transferred document D3 to the document discharging plate 207 after the image reading operation is completed.

Furthermore, a guide unit 125 is also included for allowing the document D3 fed from the document feeding tray 121 to be guided along an image reading path to the document discharging plate 107.

Here, the ADF 120 is provided on one side of an upper part of the cover 105, and is installed to move according to the opening and closing operation of the cover 105.

Figure 3:
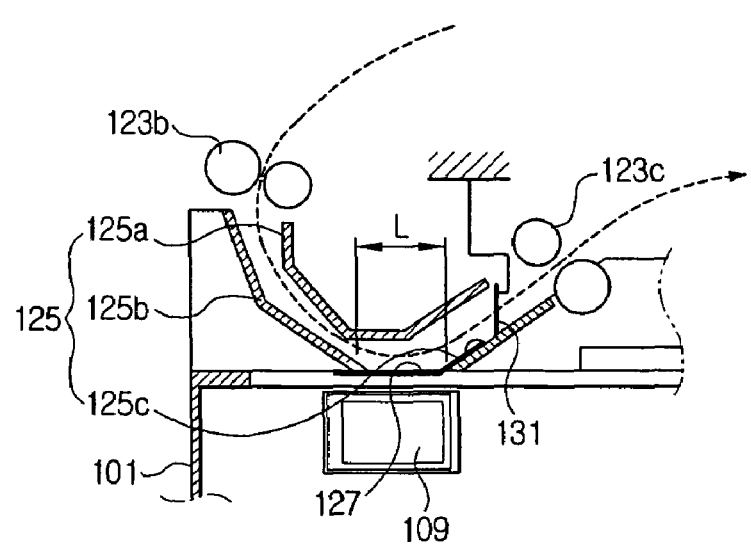
FIG. 3 is an enlarged view of an example guide unit and guide film arrangement of the image reader shown in FIG. 2.
Figure 4:
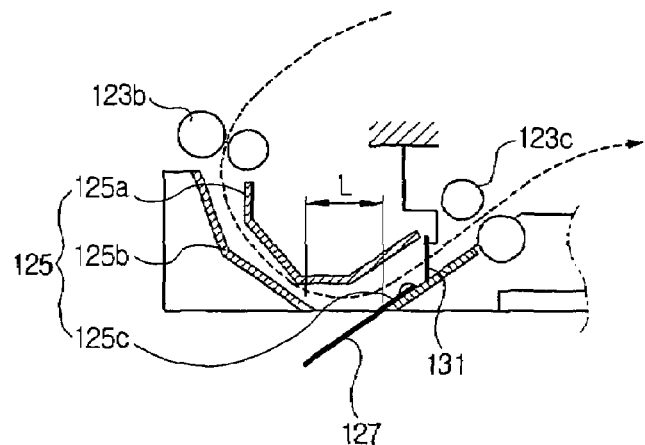
FIG. 4 is a view for showing the guide unit and guide film arrangement of the image reader shown in FIG. 2, when a cover is rotated.

FIG. 3 is an enlarged view of a guide unit and guide film arrangement shown in part "II", FIG. 2, which explains the constitution of the guide unit 125 of the image forming apparatus according to an embodiment of the invention, and FIG. 4 is an enlarged view of the guide unit and guide film arrangement of an image reader 100, shown in FIG. 2, when the cover 105 is open.

Referring to FIG. 3, the guide unit 125 includes an upper guide member 125a and lower guide members 125b and 125c. Here, the lower guide members 125b and 125c are installed at a predetermined interval L such that the transferred document D3, as shown in FIG. 2, is exposed to the image reading sensor 109. In order to cover a part forming the predetermined interval L between first and second lower guide members 125b and 125c, the guide film 127 is additionally installed.

Meanwhile, an antistatic brush 131 connected to a ground unit (not shown) is additionally installed on the second lower guide member 125c on which the document D3 is discharged, via discharge rollers 123c, to the discharge plate 107. Preferably, the antistatic brush 131 is constituted to have a length corresponding to a width of the transferred document D3 and then removes static electricity generated from the document D3 while the document D3 passes through the guide film 127.

Referring to FIG. 4, one end of the guide film 127 is connected to an upper surface of the second lower guide member 125c, and the other end thereof is projected under the first lower guide member 125b, so as to move freely. Here, the guide film 127 may be attached by adhesive and the like on the upper surface of the second lower guide member 125c.

According to the embodiment of the present invention, if the cover 105 is closed, the guide film 127 is contacted with the document D3 on an upper surface thereof and guides the document D3 to the document discharging plate 107, via discharge rollers 123c. On the other hand, if the cover 105 is opened, the guide film 127 is unfolded and then allows foreign materials, for example, paper particles (that is, small particles generated from the document D3) or toner particles, which are possible to attach on the upper surface thereof, to be dropped therefrom, typically, by virtue of gravity and/or by virtue of the guide film 127 being elastic when the cover 105 is rotated about a distal end of an image reading table 101 from an closed position to an open position, or vice-versa. Herein, the toner particles denote toner particles dropped from the document by virtue of contact.

Now, the operation principle of the image reader 100 for use in an image forming apparatus according to an embodiment of the present invention will be described as follows.

First, as for the ADF scanning method, the individual sheets of the document D3 piled up on the document feeding tray 121 are picked up by the pick up roller 123a and then transferred to a location to which the image reading sensor 109 performs an image reading operation, via the transfer rollers 123b, and subsequently are discharged on the document discharging plate 107, via the discharge rollers 123c.

At this time, the image reading sensor 109 stops at a position opposed to a part between the first and second lower guide members 125b and 125c, and then reads an image of the transferred document D3. While the document D3 is transferred and in contacted with the guide film 127, the static electricity may be generated; however, the static electricity can be removed by the antistatic brush 131, while the document D3 is in contact with the antistatic brush 131.

Now, as for the flatbed scanning method, after placing the document D4 on the document glass 103, the image reading sensor 109 reads the image of the document D4 while the image reading sensor 109 is moving in an arrow direction (⇆) in the image reading table 101.

Meanwhile, if the cover 105 is opened, the guide film 127 which is passed between the first and second lower guide members 125b and 125c is unfolded, and, as a result, foreign materials accumulated on the guide film 127 can be advantageously dropped therefrom.

Even though the guide film 127 is suspended in a cantilever type, the foreign materials on the guide film 127 are allowed to be dropped by force of gravity and/or by elasticity of the guide film 127 when the cover 105 is rotated about a distal end of an image reading table 101 from an closed position to an open position, or vice-versa. However, some foreign materials may still remain on the guide film 127. In order to resolve this problem, a contamination checking unit 150 is further incorporated for periodically checking the contamination level of the guide film 127.

Figure 5:
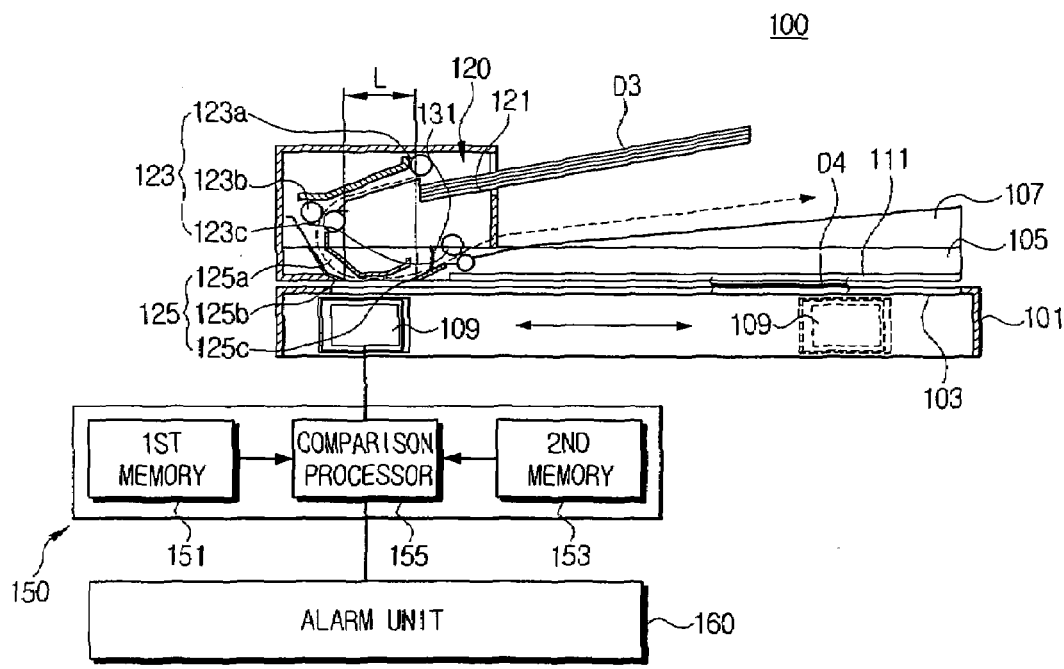
FIG. 5 is a schematic view of an image reader including a contamination checking unit for checking the contamination state of a guide film according to an embodiment of the present invention.

FIG. 5 is a schematic view of an image reader further including a contamination checking unit 150 for checking the contamination level of the guide film 127 according to an embodiment of the present invention. For purposes of brevity, parts identical to the parts shown in FIG. 2 are given same numerals and their detailed explanation is omitted.

Referring to FIG. 5, the contamination checking unit 150 includes a first memory 151 for storing basic scan data obtained under an initial condition that a document is not existed and being fed into the image reader 100 for an image reading operation, a second memory 153 for storing measured scan data obtained again under the condition that the document is not existed and being fed into the image reader 10 after performing the image reading operation of the document in a predetermined cycle, and a comparison processor 155 for comparing the value saved in the first memory 151 and the value saved in the second memory 153 and determining whether the guide film 127 is contaminated based on the comparison result. Here, the second memory 153 may be a flash memory or other storage devices.

In case of determining that the guide film 127 is contaminated by means of the comparison processor 155, an alarm unit 160 is further included for providing a warning of an abnormal state thereof. The alarm unit 160 may be applicable using various means such as Liquid Crystal Display (LCD), Light Emitting Diode (LED) and the like. Here, for the purpose of an alarm method, in case of applying to an image forming apparatus to be described in connection with FIG. 8, a printing message may be generated in lieu of the visual display of such an abnormality generated from the alarm unit 160.

Now, the process for checking whether the guide film 127 is contaminated by the contamination checking unit 150 will be described with reference to FIG. 6.

Specifically, FIG. 6 is a flow chart of a process for checking the contamination state of a guide film arranged in an image reader 100 according to an embodiment of the present invention.

Referring to FIG. 6, firstly, an image reading operation is performed under a condition that the document D3 is not fed and a guide film 127 is not contaminated, and then the basic scan data is obtained and saved in the first memory 151. (S10)

Then, the document D3 is fed from the ADF 120, via transfer rollers 123b, and is transferred through the guide film 127 to the document discharging plate 107, via discharge roller 123c. During this process, the normal image reading operation for reading the image of the document D3 through the image reading sensor 109 is performed. (S30)

During continuously performing the image reading operation, the contamination checking unit 150 determines whether the image reading operation has reached a predetermined cycle. (S50) Here, the cycle may be determined when the number of the document D3 processed by the image reading operation has reached the base number of sheets.

When the normal image reading operation has reached the predetermined cycle, the image reading operation is performed again under the condition that the document D3 is not fed, and the measured scan data about the contamination level of the guide film 127 is obtained. The obtained scan data is saved in the second memory 153. (S70)

Then, the comparison processor 155 compares the basic scan data with the measured scan data, and determines whether the guide film 127 is contaminated based on the comparison result. (S90)

If the guide film 127 is contaminated, the alarm unit 157 warns a user of the abnormal state such that the user takes proper steps to correct such an abnormality. (S110)

Meanwhile, as described above, in case of determining that the guide film 127 is contaminated using the contamination checking unit 150, the user may replace the contaminated guide film 127 with a new guide film.

Figure 7A:
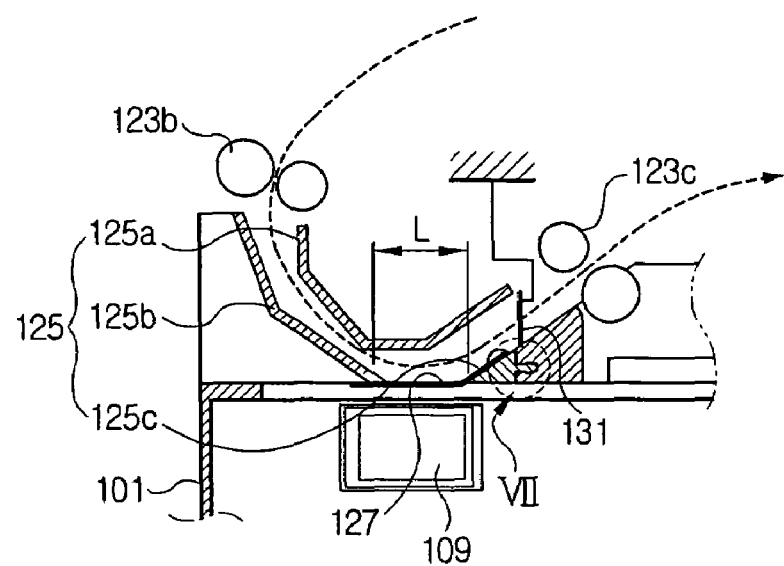
FIG. 7A is a view for showing an example structure of a guide film according to an embodiment of the present invention.
Figure 7B:
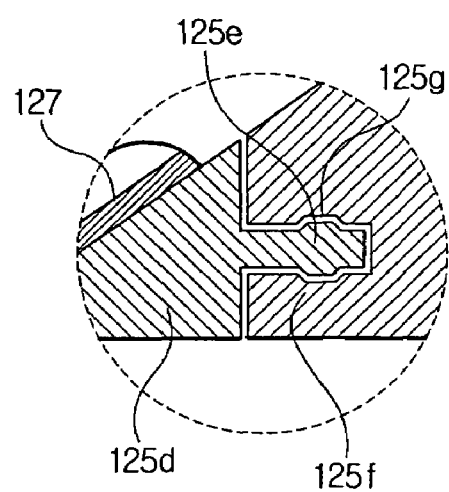
FIG. 7B is an enlarged view of the part "VII" shown in FIG. 7A.

FIG. 7A is a view for showing an example structure of a guide film according to an embodiment of the present invention, and FIG. 7B is an enlarged view of the part "VII" shown in FIG. 7A.

Referring to FIG. 7A and FIG. 7B, a guide film 127 may be made of transparent material and can exhibit a high degree of elasticity. A portion of the second lower guide member 125c attached to the guide film 127 has a detachable structure. The detachable structure consists of a hooking projection 125e formed on one part of the lower guide member 125c to which the guide film 127 is attached and a fitting recess 125g formed on the other part of the lower guide member 125c for receiving the hooking projection 125e. Here, the position of the hooking projection 125e may be replaced with that of the fitting recess 125g. From the foregoing, when the guide film 127 is contaminated or damaged, it may be easily replaced.

Now, an image forming apparatus incorporating an image reader 100 according to an embodiment of the present invention will be described with reference to FIG. 8.

Figure 8:
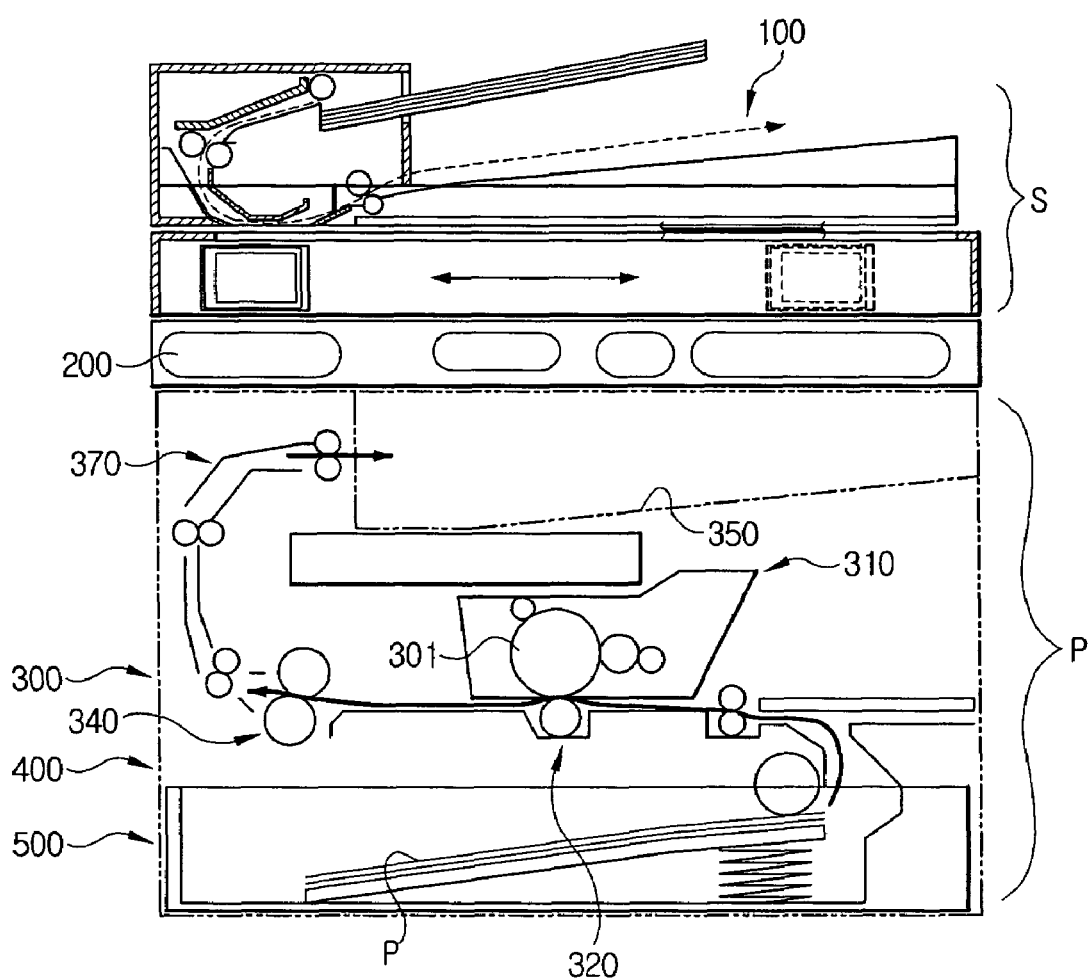
FIG. 8 is a schematic view of an image forming apparatus having an image reader according to an embodiment of the present invention.

FIG. 8 is a schematic view of an image forming apparatus having an image reader 100 according to an embodiment of the present invention.

Referring to FIG. 8, the image forming apparatus includes an image reading part S including an image reader 100 as shown in FIG. 2, and an image forming part P including an image former 300 for forming an image on an individual sheet of paper fed from a paper feeding cassette 500, via a paper feeding mechanism 400, by an electro photographic method on the basis of the image information which is read by the image reader 100.

The image forming part P includes an image former 300 for forming a toner image on a photosensitive body 301 by means of electric charge, exposure, and development; a transcription unit 320 for transcribing the toner image formed on the photosensitive body 301 to the paper P, a paper feeding mechanism 330 for receiving the paper P from the paper feeding cassette 500, and feeding the same to the transcription unit 320, a fixing unit 310 for fixing the image transcribed through the transcription unit 320 on the paper P, and a discharging unit 370 for discharging the paper P with the fixed image to a discharging part 350.

In FIG. 8, a reference number "200" indicates a control panel provided with a display panel and various control buttons for controlling the operation of the image forming apparatus.

While the present invention has been particularly shown and described with reference to exemplary embodiments thereof, it will be understood by those of ordinary skill in the art that various changes in form and details may be made therein without departing from the spirit and scope of the present invention. For example, components of a guide unit 125, as shown in FIG. 4, can be arranged differently as long as a guide film 127 is utilized in the manner described. Similarly, the contamination checking unit 150 and the alarm unit 160, as shown in FIG. 5, can be incorporated into existing components of the image forming apparatus, such as a system controller. Moreover, such a system controller can be implemented as a chipset having firmware, or alternatively, a general or special purposed computer programmed to implement methods as described with reference to FIG. 6. Accordingly, it is intended, therefore, that the present invention not be limited to the various example embodiments disclosed, but that the present invention includes all embodiments falling within the scope of the appended claims.

What is claimed is:

1. An image reading apparatus, comprising:
   an image reading table;
   a document glass installed on an upper side of the image reading table, to support a document;
   an image reading sensor provided under the document glass, to perform an image reading operation;
   a cover to selectively cover the document glass;
   an automatic document feeder (ADF) to feed a document along an image reading path, past the image reading sensor;
   a document discharging plate to support a document discharged from the ADF;
   first and second guide members installed in the ADF, to guide a document along the image reading path, through the ADF, the first and second guide members being installed at an interval with respect to the document glass, such that a document is exposed to the image reading sensor through the interval; and
   a guide film installed to cover the interval between the first and second guide members, to guide a document along the image reading path between the first and second guide members.

2. The image reading apparatus according to claim 1, wherein the guide film is made of transparent material.

3. The image reading apparatus according to claim 1, wherein one end of the guide film is connected to an upper surface of the second guide member, and the other end of the guide film is projected under the first guide member, such that the guide film is elastically moved according to the opening and closing operations of the cover.

4. The image reading apparatus according to claim 1, wherein one end of the guide film is detachably connected to the second guide member, such that the guide film is replaceable.

5. The image reading apparatus according to claim 1, wherein the second guide member comprises an antistatic brush to remove static electricity from a document.

6. The image reading apparatus according to claim 5, wherein the antistatic brush has a length corresponding to the width of a document.

7. The image reading apparatus according to claim 1, further comprising a contamination checking unit to determine whether the guide film is contaminated.

8. The image reading apparatus according to claim 7, the contamination checking unit comprises:
   a first memory to store basic scan data obtained by performing the image reading operation when no document is fed along the image reading path;
   a second memory to store measured scan data obtained by performing the image reading operation when no document is fed along the image reading path, after performing the image reading operation a number of times, when documents are disposed at the image reading sensor; and
   a comparison processor to compare the basic scan data and the measured scan data, to determine whether the guide film is contaminated.

9. The image reading apparatus according to claim 8, further comprising an alarm unit to generate a warning indicating that the guide film is contaminated.

10. The image reading apparatus according to claim 9, wherein the alarm unit is one of a Liquid Crystal Display (LCD) and a Light Emitting Diode (LED).

11. An image forming apparatus, comprising:
    an image reading table;
    a document glass installed on an upper side of the image reading table, to support document;
    an image reading sensor installed under the document glass, to perform an image reading operation;
    a cover to selectively cover the document glass;
    an automatic document feeder (ADF) to feed a document along an image reading path, past the image reading sensor;
    a document discharging plate to support a document discharged from the ADF;

first and second guide members installed in the ADF, to guide a document along the image reading path, the first and second guide members being installed at an interval with respect to the document glass, such that a document is exposed to the image reading sensor through the interval;

a guide film to cover the interval between the first and second guide members, to guide a document along the image reading path between the first and second guide members; and an image forming part to form the image on a printable medium.

12. The image forming apparatus according to claim 11, wherein the guide film is made of transparent material.

13. The image forming apparatus according to claim 11, wherein one end of the guide film is connected to an upper surface of the second lower guide member, and the other end of the guide film is projected under the first lower guide member, such that the guide film is elastically moved, according to the opening and closing operations of the cover.

14. The image forming apparatus according to claim 11, wherein one end of the guide film is detachably connected to the second guide member, such that the guide film is replaceable.

15. The image forming apparatus according to claim 11, wherein the second guide member comprises an antistatic brush to remove static electricity from a document.

16. The image forming apparatus according to claim 15, wherein the antistatic brush has a length corresponding to the width of a document.

17. The image forming apparatus according to claim 11, further comprising a contamination checking unit to determine whether the guide film is contaminated.

18. The image forming apparatus according to claim 17, wherein the contamination checking unit comprises:

a first memory to store basic scan data obtained by the performing image reading operation when no document is fed along the image reading path;

a second memory to store measured scan data obtained by performing the image reading operation when no document is fed along the image reading path, after performing the image reading operation a number of times, when documents are disposed at the image reading sensor; and a comparison processor to compare the basic scan data and the measured scan data, to determine whether the guide film is contaminated.

19. The image forming apparatus according to claim 11, further comprising an alarm unit to generate a warning indicating that the guide film is contaminated.

20. The image forming apparatus according to claim 19, wherein the alarm unit is one of a Liquid Crystal Display (LCD) and a Light Emitting Diode (LED).

21. A method for checking contamination of a guide film of an image reading apparatus, comprising:

performing a scanning operation through the guide film, when a document is not fed along the guide film and the guide film is not contaminated, to obtain basic scan data;

performing the scanning operation while feeding a document through an automatic document feeder (ADF) past the guide film, while reading an image of the document through the guide film, using image reading sensor;

comparing a current number of scanned documents to a predetermined number of scanned documents;

when the current number of scanned documents is greater than the predetermined number of scanned documents, performing the image reading operation without feeding a document along the guide film, to obtain measured scan data; and comparing the basic scan data to the measured scan data, to determine whether the guide film is contaminated.

22. The method according to claim 21, further comprising generating an alarm to warn a user of an abnormal state of the guide film, if determined that the guide film is contaminated.

23. The method according to claim 22, wherein the alarm is generated, via an alarm unit made of one of a Liquid Crystal Display (LCD) and a Light Emitting Diode (LED).

24. An image reader for use in an image forming apparatus having an image reading table provided with a platen glass, comprising:

an image reading sensor provided under the platen glass, to perform an image reading operation;

a cover rotatably fixed at a distal end of the image reading table, to selectively cover the platen glass;

an automatic document feeder (ADF) disposed on the cover, to feed a document along an image reading path, past the image reading sensor;

a document discharging plate to receive a document discharged from the ADF;

first and second guide members arranged inside the ADF, to guide a document along the image reading path, the first and second guide being members disposed at the platen glass, so as to form an opening through which a document is exposed to the image reading sensor; and a guide film to cover the opening, to guide a document along the image reading path, between the first and second guide members.

25. The image reader according to claim 24, wherein the guide film is made of transparent material, and is elastic such that, when the cover is closed, the guide film is pressed against the platen glass to seal the opening during the image reading operation, and when the cover is opened, the guide film is unfolded to release any foreign material accumulated thereon during the image reading operation.

26. The image reader according to claim 24, wherein the guide film is installed to be replaceable, and is attached to an outlet guide member that has a detachable structure.

27. The image reader according to claim 24, wherein an outlet guide member comprises an antistatic brush to remove static electricity from a document, wherein the length of the antistatic brush corresponds to the width of a document.

28. The image reader according to claim 24, further comprising a contamination checking unit for checking whether the guide film is contaminated, the contamination checking unit comprising:

a first memory to store basic scan data obtained by performing the scanning operation when no document is disposed at the image reading sensor;

a second memory to store measured scan data obtained by performing the scanning operation when no document is disposed at the image reading sensor and after performing the scanning operation a number of times, when documents are disposed at the image reading sensor; and a comparison processor to compare the basic scan data with the measured scan data, to determine whether the guide film is contaminated.

29. The image reader according to claim 28, further comprising an alarm unit to generate a warning indicating that the guide film is contaminated.

30. The image reader according to claim 29, wherein the alarm unit is one of a Liquid Crystal Display (LCD) and a Light Emitting Diode (LED).

* * * * *

UNITED STATES PATENT AND TRADEMARK OFFICE
CERTIFICATE OF CORRECTION

| | | |
|---|---|---|
| PATENT NO. | : 7,719,730 B2 | Page 1 of 1 |
| APPLICATION NO. | : 11/289498 | |
| DATED | : May 18, 2010 | |
| INVENTOR(S) | : Sang-cheol Park et al. | |

It is certified that error appears in the above-identified patent and that said Letters Patent is hereby corrected as shown below:

Column 10, Line 59, change "to support document;" to --to support a document;--.

Column 11, Line 35-36, change "by the performing" to --by performing the--.

Signed and Sealed this

Seventeenth Day of August, 2010

David J. Kappos
*Director of the United States Patent and Trademark Office*